United States Patent
Butz

(10) Patent No.: US 11,957,525 B2
(45) Date of Patent: Apr. 16, 2024

(54) INTERDENTAL CLEANER

(71) Applicant: Sunstar Suisse SA, Etoy (CH)

(72) Inventor: Jürgen Butz, Utzenfeld (DE)

(73) Assignee: Sunstar Suisse SA, Etoy (CH)

( * ) Notice: Subject to any disclaimer, the term of this patent is extended or adjusted under 35 U.S.C. 154(b) by 472 days.

(21) Appl. No.: 17/289,391

(22) PCT Filed: Sep. 24, 2019

(86) PCT No.: PCT/EP2019/000278
§ 371 (c)(1),
(2) Date: Apr. 28, 2021

(87) PCT Pub. No.: WO2020/098966
PCT Pub. Date: May 22, 2020

(65) Prior Publication Data
US 2021/0386531 A1    Dec. 16, 2021

(30) Foreign Application Priority Data

Nov. 14, 2018 (DE) .................. 10 2018 008 963.1

(51) Int. Cl.
*A61C 15/02* (2006.01)
*A46B 3/00* (2006.01)
(Continued)

(52) U.S. Cl.
CPC .............. *A61C 15/02* (2013.01); *A46B 3/005* (2013.01); *A46B 9/026* (2013.01); *A46B 9/04* (2013.01); *A46B 2200/108* (2013.01)

(58) Field of Classification Search
CPC ........ A61C 15/00; A61C 15/02; A61C 15/046; A46B 3/00; A46B 3/005; A46B 9/04;
(Continued)

(56) References Cited

U.S. PATENT DOCUMENTS

| 2011/0041271 A1 | 2/2011 | Huang |
| 2018/0193119 A1 | 7/2018 | Butz |

(Continued)

FOREIGN PATENT DOCUMENTS

| DE | 102012015664 A1 | 2/2014 |
| EP | 3219291 A1 | 9/2017 |
| WO | 2014/167592 A1 | 10/2014 |

OTHER PUBLICATIONS

International Search Report, with English translation, issued in corresponding International Application No. PCT/EP2019/000278 dated Dec. 3, 2019 (5 pages).
(Continued)

*Primary Examiner* — Rachel R Steitz
*Assistant Examiner* — Karim Asqiriba
(74) *Attorney, Agent, or Firm* — FLYNN THIEL, P.C.

(57) ABSTRACT

An interdental cleaner has a rod-shaped support which is made of plastics material and the rear end region of which has a handle part and the opposite front end region of which supports a coating made of a soft-elastic plastics material. At least one radially protruding finger which is integrally connected to the coating is arranged on the outside of the coating. A recess is formed in the outer surface of the coating, and the radially inner foot region of the finger is arranged in the recess and is connected to the coating at the bottom of the recess.

20 Claims, 5 Drawing Sheets

(51) Int. Cl.
*A46B 9/02* (2006.01)
*A46B 9/04* (2006.01)

(58) Field of Classification Search
CPC .......... A46B 15/0069; A46B 2200/108; A46B 5/0012; A46B 2200/1053; A45D 40/262; A45D 40/265; A45D 34/042; A45D 34/043; A45D 34/045
See application file for complete search history.

(56) References Cited

U.S. PATENT DOCUMENTS

| | | | |
|---|---|---|---|
| 2019/0125506 A1* | 5/2019 | Butz | A46B 15/0069 |
| 2021/0236252 A1* | 8/2021 | Kikkawa | A46B 9/021 |
| 2023/0200523 A1* | 6/2023 | Komatsu | A46B 3/005 |
| | | | 132/329 |

OTHER PUBLICATIONS

Written Opinion of International Searching Authority issued in corresponding International Application No. PCT/EP2019/000278 dated Dec. 3, 2019 (6 pages).
German Search Report issued in corresponding German Application No. 10 2018 008 963.1, dated Aug. 9, 2019 (5 pages).

* cited by examiner

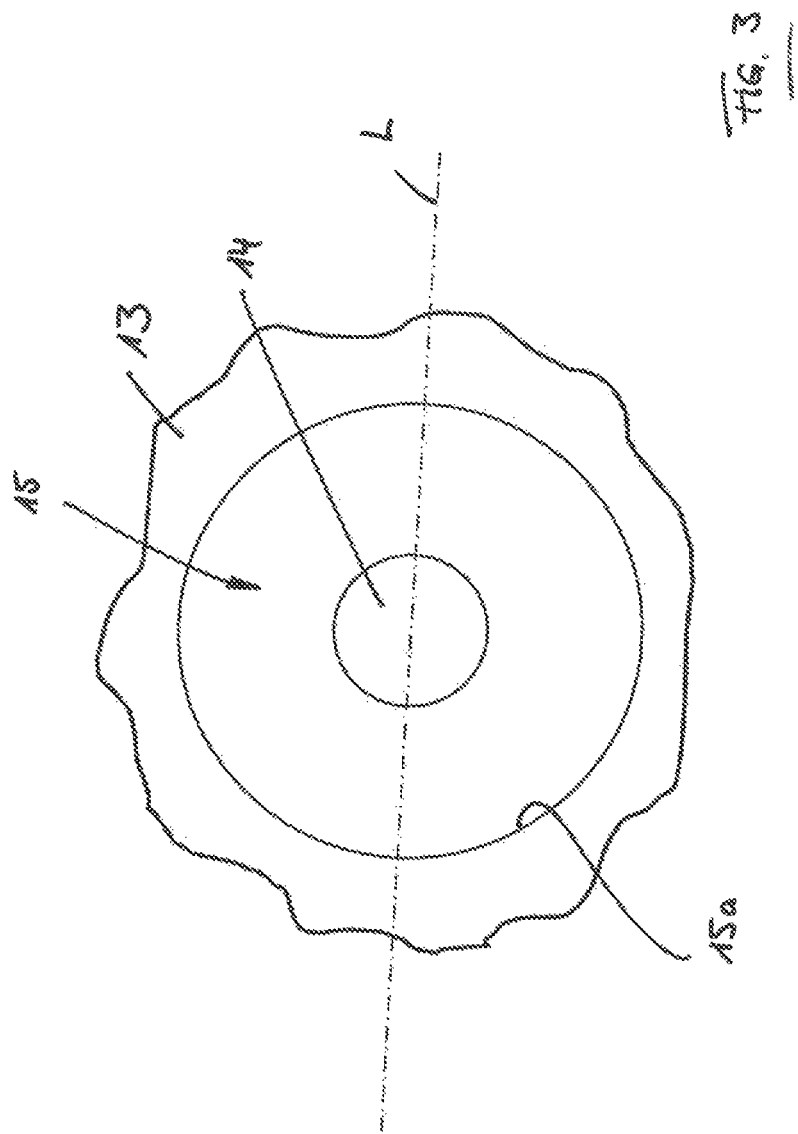

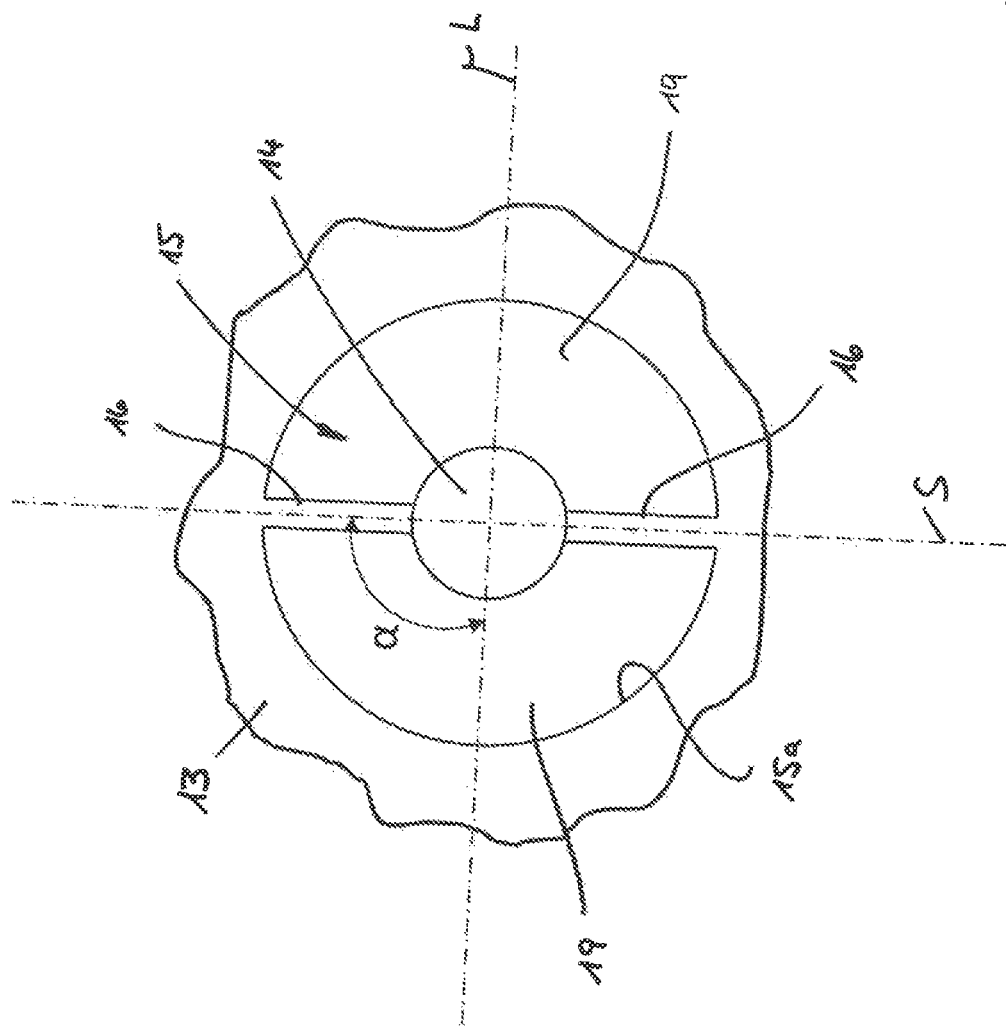

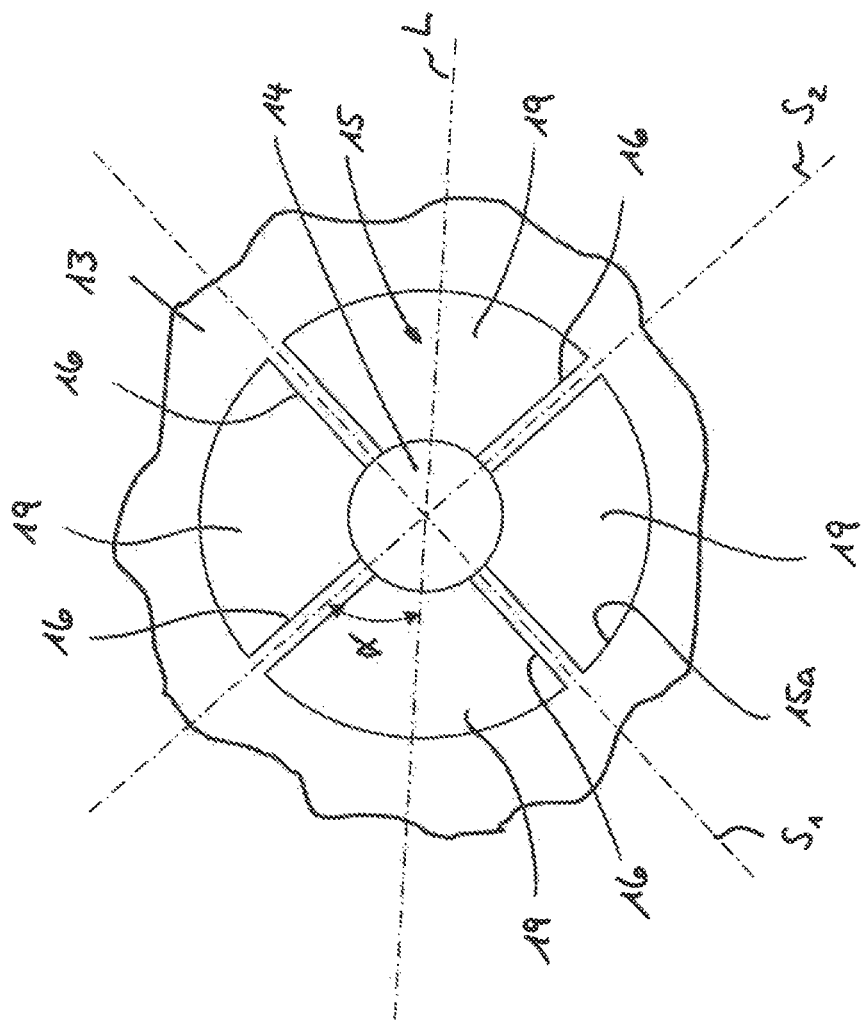

INTERDENTAL CLEANER

FIELD OF THE INVENTION

The invention relates to an interdental cleaner comprising a rod-shaped support which is made of plastics material and the rear end region of which has a handle part and the opposite front end region of which supports a coating made of a soft-elastic plastics material, at least one radially protruding finger which is integrally connected to the coating being arranged on the outside of the coating.

BACKGROUND OF THE INVENTION

To clean the spaces between the teeth, toothpicks made of wood or plastics material or interdental brushes are usually used. The earlier design of an interdental brush consists of two parallel metal wires, between which a large number of prefabricated plastics bristles is arranged. The metal wires are twisted about their longitudinal axis, as a result of which the bristles are clamped between the metal wires and are distributed over the circumference of the metal wires. A suitable interdental brush makes it possible to use the fine bristles to get into even narrow spaces between the teeth, the bristles having both a high degree of flexibility and very good shape retention. Drawbacks of these so-called wired interdental brushes are the complex and expensive production as well as the use of metal wires, which many users do not like to have in their mouth.

In order to improve the interdental brushes mentioned, interdental cleaners made of plastics material have been developed which have a rod-shaped support that is made of plastics material and has a usually planar handle part at its rear end. A coating made of a soft-elastic plastics material, for example a thermoplastic elastomer, or made of silicone, is injected onto the front end of the support. In order to improve the cleaning effect, the coating has, on its outside, radially protruding fingers which consist of the same material as the coating and are formed integrally therewith. When using the interdental cleaner, the fingers are intended to take over the function of the bristles of the mentioned interdental brush. Corresponding interdental brushes are known, for example, from DE 10 2012 015 664 A1, US 2018/0193119 A1 and WO2014/167592 A1.

SUMMARY OF THE INVENTION

In order to get into narrow spaces between the teeth, the cross-sectional dimensions of the fingers have to be as small as possible. However, this is countered by the requirement that the fingers must have sufficient flexibility and stability so that they do not tear off or kink when the interdental cleaner is used. If the fingers are designed to have a larger diameter or a larger connection radius (radius of the fillet at the foot of the finger) in order to prevent breaking off or kinking, it is difficult to reach and clean very narrow gaps or spaces between the teeth.

The object of the invention is that of creating an interdental cleaner of the type mentioned, in which the fingers can have small dimensions without the risk of breaking off or kinking.

According to the invention, a recess is formed in the outer surface of the coating, and the radially inner foot region of the finger is arranged in the recess and is connected to the coating at the bottom of the recess.

The invention is based on the basic concept of not simply molding the finger on the outer surface of the coating, but rather shifting the region of connection between the coating and the finger by a small amount radially inward from the outer surface of the coating, i.e., toward the support of the interdental cleaner. This means that the external loads acting on the finger when the interdental cleaner is used always act at a distance from the foot region of the finger, so that the finger can give way as a result of these loads without tearing off or kinking.

In this description, the term "axial" denotes a direction along a longitudinal axis of the rod-shaped support and thus of the interdental cleaner, or parallel thereto. The term "radial" denotes a direction extending perpendicularly to the longitudinal axis of the interdental cleaner.

A large number of radially protruding fingers is preferably provided on the outer surface, the radially inner foot region of a plurality of said fingers, and preferably of all of said fingers, being molded in a recess in the manner mentioned. A separate recess is preferably provided for each finger. In the following, only a single finger is outlined by way of example.

The recess in the coating leads to a reduction in the wall thickness of the coating in this region. This ensures that the plastics material of the coating and the fingers flows into the partial cavity forming the finger during the injection process at an increased flow rate, which in turn leads to a stronger longitudinal orientation of the macromolecules of the plastics material within the relevant finger. This longitudinal orientation of the macromolecules of the plastics material improves the shape retention behavior of the finger.

In a preferred embodiment of the invention, the foot region of the finger transitions continuously and in an edge-free manner into the coating. This can be achieved, for example, in that the transition between the lower end or the foot region of the finger and the bottom of the recess is connected via a rounded continuous transition region. In this way, edges, corners or other points of discontinuity that can lead to notch stresses are reliably prevented. This rounded transition region is preferably located completely within the recess. In this way, the radial thickness of the coating is not increased by the transition region.

It has proven to be advantageous if the support consists of a dimensionally stable plastics material, in particular polypropylene or polyamide, and/or predominantly contains the mentioned materials or contains said materials in a mixture. Alternatively, the support can also consist of polybutylene terephthalate, polyester, polyethylene or also of an impact-modified plastics material such as polycarbonate or polystyrene, or can predominantly contain the mentioned materials or contain said materials in a mixture. The plastics material of the support can be fiber-reinforced, for which purpose glass fibers and/or natural fibers and/or carbon fibers can be used, for example.

The coating and the finger can consist entirely or at least predominantly of a thermoplastic elastomer, for example having a Shore hardness of 20 to 80 Shore and in particular having a Shore hardness of 20 to 40 Shore, of a thermoplastic polyurethane or of silicone, or can predominantly contain the mentioned materials or contain said materials in a mixture. A further plastics material, in particular polypropylene and/or polyethylene, can optionally be used proportionally or added proportionally.

In a possible embodiment of the invention, the foot region of the finger is surrounded by a completely circumferential annular groove. The foot region of the finger is thus connected to the coating only at the bottom of the recess, but the foot region of the finger is free in the circumferential direction. This has the advantage that the finger can bend under the action of shear forces and/or bending moments within the recess, which is particularly helpful when introducing the interdental cleaner into narrow spaces between the teeth. The connection region at the foot of the finger or the connection radius therefore does not impede the functionality of the finger during use.

In an alternative embodiment of the invention, the foot region of the finger is surrounded by a plurality of annular groove portions, each extending over a portion of the circumference of the finger. Thus, the finger is not completely free on the bottom of the recess, but is also connected to a side wall of the recess. In particular, this can be achieved in that at least one connecting portion is provided which is arranged within the recess and connects the foot region of the finger to the side wall of the recess. The connecting portion consists of the same material as the coating and the fingers and is integrally connected thereto.

When using the interdental cleaner, the user grasps it by the handle portion and introduces it into the spaces between the teeth in the longitudinal direction of the interdental cleaner. Therefore, the bending of the finger in the axial direction or in the direction of the longitudinal axis of the interdental cleaner should preferably not be impeded. Accordingly, the longitudinal extension of the connecting portion deviates significantly from the longitudinal axis of the interdental cleaner. In particular, the connecting portion extends at an angle $\alpha$ to the longitudinal axis of the interdental cleaner, $\alpha$ being in the range of from 30 to 90°.

The mounting properties of the finger in the recess or on the coating can be changed via the number and/or the alignment and/or the dimensions of the connecting portion or connecting portions. In a possible embodiment of the invention, at least two connecting portions can be arranged on opposite sides of the finger. However, it is also possible that three or four connecting portions are arranged so as to be distributed over the circumference of the finger.

The finger preferably has a conical shape tapering toward its free end. Due to the arrangement of the foot region of the finger within the recess, the finger can be designed to be relatively slender. The slenderness is defined as the freely projecting part of the finger divided by the foot diameter. The foot diameter is measured in the cross-sectional plane of the finger which lies in the area defined by the outer surface of the coating. The length of the finger is measured from the aforementioned cross-sectional plane to the free end of the finger. The corresponding slenderness of the finger should preferably be in the range of from 2 to 10 and in particular in the range of from 4.0 to 6.0.

A depth of the recess, i.e., the distance between the bottom of the recess and the outer surface of the coating surrounding the recess, should be in the range of from 0.02 mm to 0.20 mm and in particular in the range of from 0.04 mm to 0.08 mm.

The diameter of the finger in the mentioned cross-sectional plane should be in the range of from 0.10 mm to 0.30 mm and in particular in the range of from 0.15 mm to 0.25 mm.

The mentioned length of the finger is, for example, in the range of from 0.5 mm to 2.0 mm and is preferably 0.8 mm to 1.2 mm.

In a preferred embodiment of the invention, the recess is circular and has a diameter in the range of from 0.20 mm to 0.60 mm and in particular in the range of from 0.35 mm to 0.45 mm.

BRIEF DESCRIPTION OF THE DRAWINGS

Further details and features of the invention will become apparent from the following description of embodiments with reference to the drawings, in which:

FIG. 3 is the top view III of the finger according to FIG. 2;

FIG. 4 is a first modification of the embodiment according to FIG. 3; and

FIG. 5 is a second modification of the embodiment according to FIG. 3.

DETAILED DESCRIPTION

Figure 1:
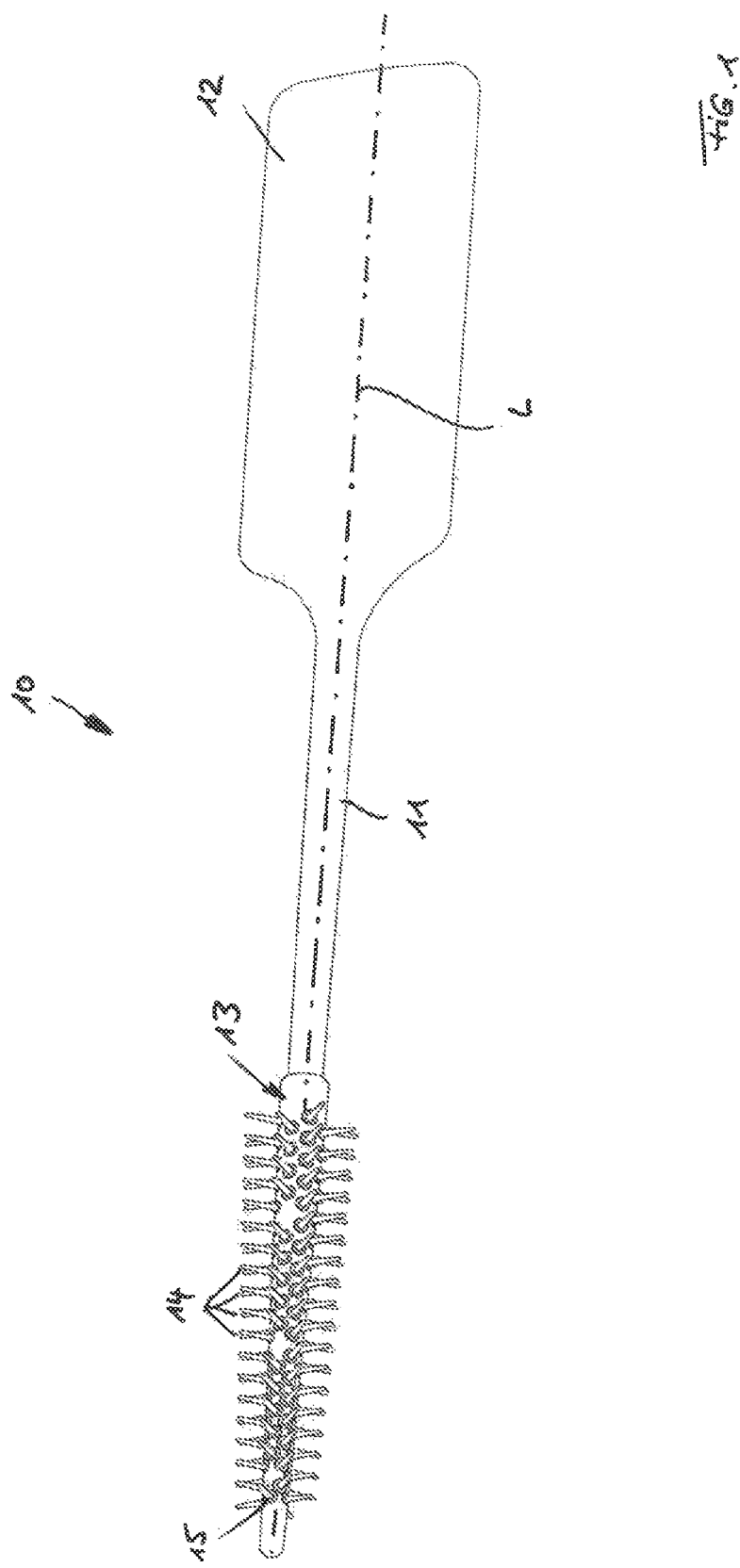
FIG. 1 is a perspective view of an interdental cleaner according to the invention.

FIG. 1 is a perspective view of an interdental cleaner 10 according to the invention which has a rod-shaped support 11. The support 11 has an axial longitudinal axis L and preferably consists of a hard or dimensionally stable plastics material.

In its end region on the right according to FIG. 1, the support 11 has a planar handle part 12 which is integrally connected to the support 11. A user can grasp the interdental cleaner 10 by the handle part 12.

In the opposite end region, on the left according to FIG. 1, a sleeve-like coating 13 made of a soft plastics material, in particular a thermoplastic elastomer, is arranged on the support 11, the coating 13 having, on its outside, radially outwardly protruding, integrally molded fingers 14. Each finger 14 is arranged in its own recess 15, which is formed in the outer surface of the coating 13.

Figure 2:
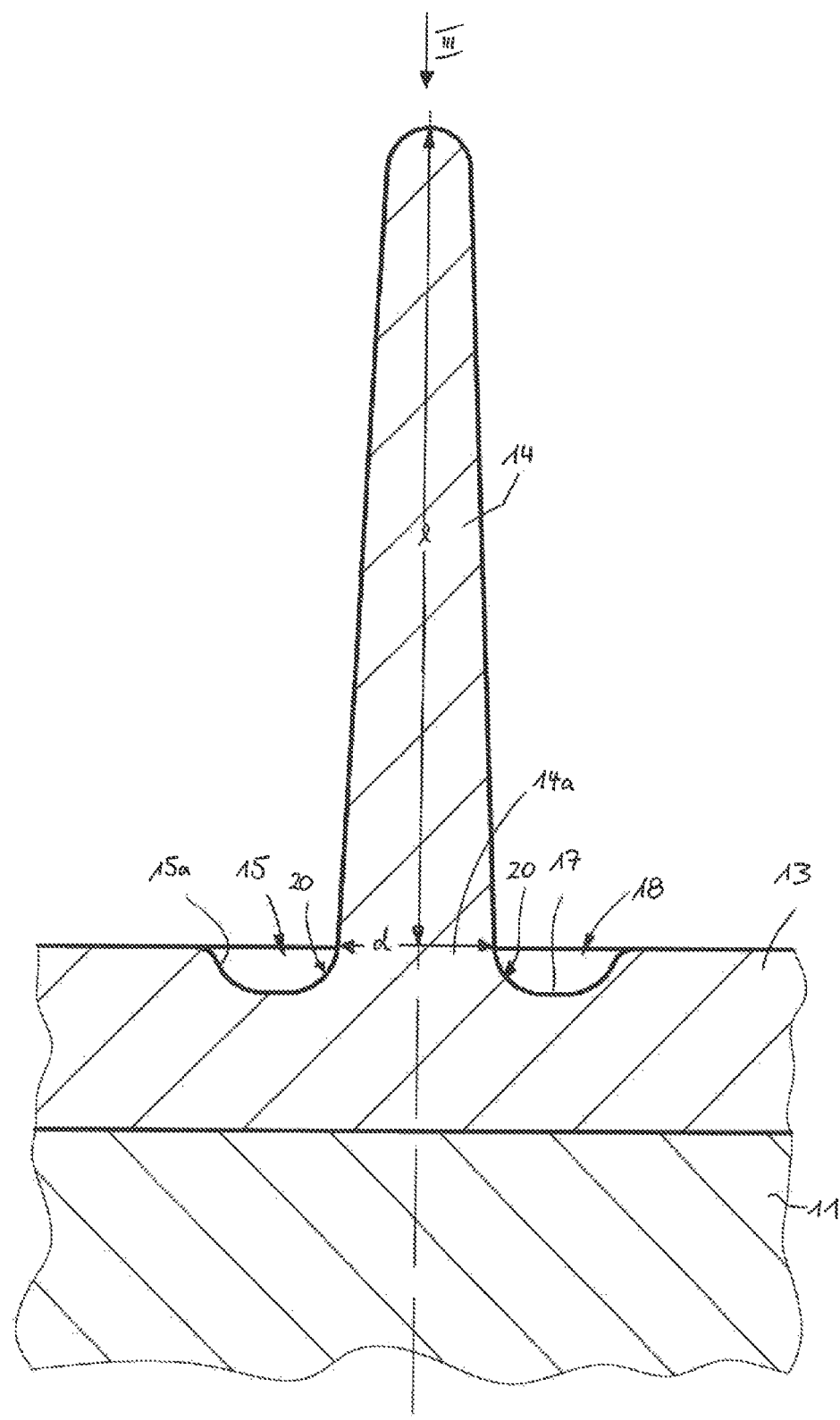
FIG. 2 is an enlarged sectional view of the interdental cleaner in the region of a finger.

It can be seen from FIGS. 2 and 3 how the fingers 14 are each molded onto the coating 13.

As shown in FIG. 3, the recess 15 is substantially circular and has a circumferential, preferably conical, side wall 15a and a bottom 17. The finger 14 has a that conically tapers toward its radially outer free end, and a foot region 14a of said finger is integrally, i.e., monolithically, connected to the coating 13 at the bottom 17 of the recess 15. The finger 14 stands freely within the recess 15, i.e., the foot region 14a of the finger 14 is surrounded by a completely circumferential annular groove 18.

A slenderness of the finger 14 is defined as the ratio of its freely projecting length 1 and the foot diameter d. As can be seen from FIG. 2, the corresponding foot diameter d is measured in the plane in which the outer surface of the coating 13 lies. The length 1 of the finger 14 is determined from the distance between the mentioned plane and the radially outer free end of the finger 14. In the embodiment shown, the finger has a slenderness of about 5, i.e., its length 1 is five times greater than its foot diameter d.

The foot region 14a of the finger 14 transitions continuously and in an edge-free manner into the bottom 17 of the recess 15 or into the coating 13, fillets 20 being formed at the lower end of the finger.

As shown in FIG. 3, in the embodiment shown, the finger 14 sits freely and centrally on the bottom 17 of the recess 15, so that the foot region of the finger 14 is surrounded by the completely circumferential, continuous annular groove 18 which is formed by the remaining regions of the recess 15.

FIG. 4 shows an alternative embodiment of the aforementioned embodiment and differs therefrom in that the foot region 14a of the finger 14 is connected to the side wall 15a of the recess 15 via two connecting portions 16 arranged within the recess 15. The connecting portions 16, which consist of the same material as the finger 14 and the coating 13 and are integrally connected thereto, increase the rigidity of the finger 14 in its foot region 14a, as a result of which the deformation properties can be influenced and adjusted.

In the embodiment shown in FIG. 4, two connecting portions 16 are arranged on opposite sides of the finger 14, these two connecting portions 16 being aligned with one another and extending along an axis S, which, in the embodiment shown, extends at an angle α of 90° to the longitudinal axis L of the interdental cleaner. The connecting portions 16 therefore do not influence, or influence only to a very small extent, the deformation properties of the finger 14 in the direction of the longitudinal axis L of the interdental cleaner 10, i.e., when the interdental cleaner 10 is used properly, whereas the deformation properties are significantly influenced perpendicularly thereto, i.e., in the direction of the axis S, by the connecting portions 16.

FIG. 5 shows a development of the embodiment according to FIG. 4 and differs therefrom in that four connecting portions 16 are now provided which are arranged so as to be distributed evenly over the circumference of the finger 14. In each case, two connecting portions 16 are arranged opposite one another and lie on a common axis $S_1$ and $S_2$. The two axes $S_1$ and $S_2$ are perpendicular to one another and extend at an angle α of 45° to the longitudinal axis L of the interdental cleaner 10.

The invention claimed is:

1. An interdental cleaner comprising a rod-shaped support which is made of plastics material and a rear end region of which has a handle part and an opposite front end region of which supports a coating made of a soft-elastic plastics material, at least one radially protruding finger which is integrally connected to the coating being arranged on an outside of the coating, wherein a recess is formed in an outer surface of the coating, and a radially inner foot region of the finger is arranged in the recess and is connected to the coating at a bottom of the recess.

2. The interdental cleaner according to claim 1, wherein the foot region of the finger transitions continuously and in an edge-free manner into the coating.

3. The interdental cleaner according to claim 2, wherein the foot region of the finger is surrounded by a completely circumferential annular groove.

4. The interdental cleaner according to claim 2, wherein the foot region of the finger is surrounded by a plurality of annular groove portions each extending over a portion of a circumference of the finger.

5. The interdental cleaner according to claim 2, wherein the foot region of the finger is surrounded by a plurality of annular groove portions each extending over a portion of a circumference of the finger.

6. The interdental cleaner according to claim 2, wherein at least one connecting portion arranged within the recess is provided which connects the foot region of the finger to a side wall of the recess.

7. The interdental cleaner according to claim 2, wherein the finger has a length to foot diameter ratio in a range of from 2 to 10.

8. The interdental cleaner according to claim 1, wherein the foot region of the finger is surrounded by a completely circumferential annular groove.

9. The interdental cleaner according to claim 8, wherein at least one connecting portion arranged within the recess is provided which connects the foot region of the finger to a side wall of the recess.

10. The interdental cleaner according to claim 1, wherein the foot region of the finger is surrounded by a plurality of annular groove portions each extending over a portion of a circumference of the finger.

11. The interdental cleaner according to claim 10, wherein at least one connecting portion arranged within the recess is provided which connects the foot region of the finger to a side wall of the recess.

12. The interdental cleaner according to claim 1, wherein at least one connecting portion arranged within the recess is provided which connects the foot region of the finger to a side wall of the recess.

13. The interdental cleaner according to claim 12, wherein the connecting portion extends at an angle α to a longitudinal axis of the interdental cleaner, α being in the range of from 30° to 90°.

14. The interdental cleaner according to claim 12, wherein the at least one connecting portion is at least two connecting portions, the at least two connecting portions being arranged on opposite sides of the finger.

15. The interdental cleaner according to claim 14, wherein the at least two connecting portions comprise three or four connecting portions arranged so as to be distributed over a circumference of the finger.

16. The interdental cleaner according to claim 1, wherein the finger has a length to foot diameter ratio in a range of from 2 to 10.

17. The interdental cleaner according to claim 1, wherein the finger has a length to foot diameter ratio in a range of from 4.0 to 6.0.

18. The interdental cleaner according to claim 1, wherein a depth of the recess is in a range of from 0.02 mm to 0.20 mm.

19. The interdental cleaner according to claim 18, wherein the depth of the recess is in the range of from 0.04 mm to 0.08 mm.

20. The interdental cleaner according to claim 1, wherein the recess is circular and has a diameter in a range of from 0.20 mm to 0.60 mm.

\* \* \* \* \*